(12) United States Patent
Weng et al.

(10) Patent No.: US 12,537,123 B2
(45) Date of Patent: Jan. 27, 2026

(54) OPTICAL SYSTEM

(71) Applicant: TDK TAIWAN CORP., Taoyuan (CN)

(72) Inventors: Chih-Wei Weng, Taoyuan (TW);
Chao-Chang Hu, Taoyuan (TW);
Yung-Hsien Yeh, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 438 days.

(21) Appl. No.: 18/155,425

(22) Filed: Jan. 17, 2023

(65) Prior Publication Data

US 2023/0229014 A1 Jul. 20, 2023

Related U.S. Application Data

(60) Provisional application No. 63/299,616, filed on Jan. 14, 2022.

(51) Int. Cl.
*H01F 7/06* (2006.01)
*G02B 27/64* (2006.01)
*G03B 17/12* (2021.01)
*H04N 23/55* (2023.01)
*H04N 23/57* (2023.01)
*H04N 23/65* (2023.01)
*H04N 23/68* (2023.01)

(52) U.S. Cl.
CPC ............ *H01F 7/066* (2013.01); *G02B 27/646* (2013.01); *G03B 17/12* (2013.01); *H04N 23/55* (2023.01); *H04N 23/57* (2023.01); *H04N 23/65* (2023.01); *H04N 23/687* (2023.01)

(58) Field of Classification Search
None
See application file for complete search history.

(56) References Cited

U.S. PATENT DOCUMENTS

| | | | |
|---|---|---|---|
| 5,826,114 A * | 10/1998 | Miyamoto | H04N 23/68 348/E5.046 |
| 8,611,733 B2 * | 12/2013 | Ohishi | H04N 23/6815 396/55 |
| 2012/0141101 A1 * | 6/2012 | Cheng | H04N 23/687 348/208.99 |
| 2014/0028906 A1 * | 1/2014 | Chen | G03B 5/00 348/375 |
| 2017/0108705 A1 * | 4/2017 | Yu | G02B 7/09 |
| 2017/0254978 A1 * | 9/2017 | Chong | G02B 7/09 |
| 2018/0239217 A1 * | 8/2018 | Konuma | G02B 7/04 |
| 2018/0284566 A1 * | 10/2018 | Minamisawa | H04N 23/54 |
| 2019/0227199 A1 * | 7/2019 | Kao | F03G 7/06143 |
| 2020/0174163 A1 * | 6/2020 | Han | G02B 5/1895 |
| 2020/0209514 A1 * | 7/2020 | Hu | H04N 23/55 |
| 2020/0393637 A1 * | 12/2020 | Ryoo | G02B 27/646 |
| 2021/0396910 A1 * | 12/2021 | Zhu | G02B 5/1809 |
| 2022/0269030 A1 * | 8/2022 | Wu | G02B 7/02 |
| 2022/0269147 A1 * | 8/2022 | Hu | G03B 5/02 |
| 2022/0272238 A1 * | 8/2022 | Jang | H04N 23/55 |

(Continued)

*Primary Examiner* — Ryan Crockett
(74) *Attorney, Agent, or Firm* — MUNCY, GEISSLER, OLDS & LOWE, P.C.

(57) ABSTRACT

An optical system is provided. The optical system includes a holder and a first compensation assembly. The holder is connected to an optical module. The first compensation assembly compensates a light. The first compensation assembly includes a first optical element. The light enters the optical module through the first compensation assembly.

19 Claims, 10 Drawing Sheets

(56) References Cited

U.S. PATENT DOCUMENTS

2022/0283477 A1* 9/2022 Wang ................. G03B 9/10
2022/0308358 A1* 9/2022 Weng ................. G02B 9/60
2022/0308421 A1* 9/2022 Hung ................. G03B 5/00
2022/0399486 A1* 12/2022 Hu ................. G03B 13/34

* cited by examiner

OPTICAL SYSTEM

CROSS REFERENCE TO RELATED APPLICATIONS

This application claims the benefit of U.S. Provisional Application No. 63/299,616, filed 2022 Jan. 14, the entirety of which is incorporated by reference herein.

BACKGROUND OF THE INVENTION

Field of the Invention

The present invention relates to an optical system, in particular to an optical system with two compensation assemblies.

Description of the Related Art

With the development of technology, many electronic devices (such as tablet computers or smartphones) are equipped with an optical system to take pictures or record videos. Shaking may occur when a user uses an electronic device equipped with an optical system, and this may cause the images to come out blurry. Therefore, with the increasingly higher requirements for image quality, how to design a small and improved optical system is an important issue.

BRIEF SUMMARY OF THE INVENTION

An embodiment of the present invention provides an optical system. The optical system includes a holder and a first compensation assembly. The holder is connected to an optical module. The first compensation assembly compensates a light. The light enters the optical module through the first compensation assembly.

According to some embodiments of the present invention, the first compensation assembly includes a first optical element. The first optical element includes a substrate, a first microstructure and a second microstructure. The substrate is made of a light-transmitting material. The first microstructure is disposed on the substrate. The second microstructure is disposed on the substrate. The first microstructure is different from the second microstructure.

According to some embodiments of the present invention, the first optical element has a center. The first microstructure is closer to the center of the first optical element than the second microstructure when viewed along a direction perpendicular to the substrate.

According to some embodiments of the present invention, the substrate includes a central region. The central region is free of any microstructures According to some embodiments of the present invention, the area of the central region is at least 10% of the area of the substrate.

According to some embodiments of the present invention, the central region at least partially overlaps the center of the optical module when viewed along a direction perpendicular to the substrate.

According to some embodiments of the present invention, the substrate includes a surface with a planar structure. The first microstructure includes a plurality of first microelements. The second microstructure includes a plurality of second microelements. Each of the first microelements has the same structure. Each of the second microelements has the same structure. The first microelements and the second microelements have different sizes.

According to some embodiments of the present invention, each of the first microelements has a cylindrical structure.

According to some embodiments of the present invention, the height of the first microelements and the second microelements are the same. The height of the first microelements or the second microelements is at least two times to three times larger than its width.

According to some embodiments of the present invention, the first compensation assembly further includes a fixed portion, a first movable portion and a first driving assembly. The first movable portion is connected to a first optical element. The first driving assembly is configured to drive the first movable portion to move between a first position and a second position relative to the fixed portion. The light enters the optical module through the first optical element when the first movable portion is in the first position, the light enters the optical module without passing through the first optical element when the first movable portion is in the second position.

According to some embodiments of the present invention, optical system further includes a second compensation assembly. The second compensation assembly compensates the light. The light enters the optical module through the second compensation assembly. The second compensation assembly includes a second movable portion and a second driving assembly. The second movable portion is connected to a second optical element. The second driving assembly is configured to drive the second movable portion to move relative to the fixed portion within a range of motion. The light enters the optical module through the second optical element when the second movable portion is located at any position in the range of motion.

According to some embodiments of the present invention, the second optical element is a lens, and the second driving assembly is configured to drive the second optical element to move relative to the fixed portion.

According to some embodiments of the present invention, the second optical element is a photosensitive element in the optical module, and the second driving assembly is configured to drive the second optical element to move relative to the fixed portion.

According to some embodiments of the present invention, the first compensation assembly and the second compensation assembly are disposed sequentially in the direction of the light, so that the light first passes through the first compensation assembly and then passes through the second compensation assembly, then enters the optical module. The area of the first optical element is smaller than the second optical element.

According to some embodiments of the present invention, the second compensation assembly and the first compensation assembly are disposed sequentially in the direction of the light, so that the light first passes through the second compensation assembly and then passes through the first compensation assembly, then enters the optical module. The area of the first optical element is larger than the second optical element.

According to some embodiments of the present invention, the optical system further includes a control element. The control element determines a mode from a non-compensation mode, a first compensation mode and a second compensation mode, to compensate the light. The first driving assembly and the second driving assembly are not driven during the non-compensation mode. The second driving assembly is driven to move the second movable portion during the first compensation mode. The first driving assembly is driven to move the first movable portion and the second driving assembly is driven to move the second movable portion during the second compensation mode. One of the non-compensation mode, the first compensation mode, and the second compensation mode is determined by the control element according to environmental conditions.

According to some embodiments of the present invention, the optical system further includes an inertial sensing element. The inertial sensing element outputs a sensing signal. The optical system determines the mode from the non-compensation mode, the first compensation mode, and the second compensation mode according to the sensing signal.

According to some embodiments of the present invention, the second compensation mode is activated when a rotation signal in the sensing signal is greater than a rotation preset value.

According to some embodiments of the present invention, the optical system further includes a sensing element. The first compensation mode is activated when a sensing signal that is greater than the first preset value is received, wherein the sensing signal is output by the sensing element.

According to some embodiments of the present invention, the second compensation mode is activated when a sensing signal that is greater than the second preset value is received, wherein the sensing signal is output by the sensing element.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the provided subject matter. Specific examples of elements and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

Figure 1:
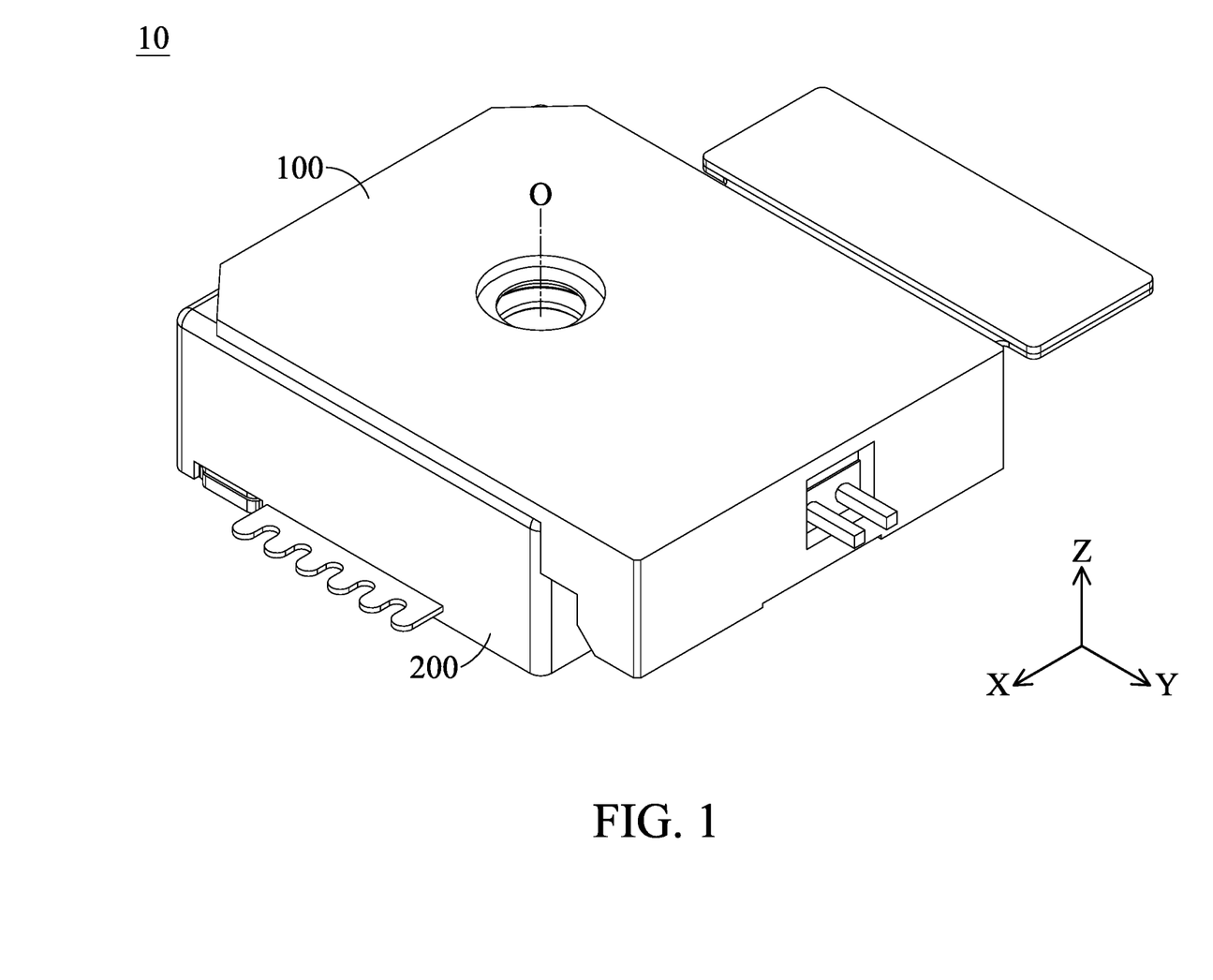
FIG. 1 shows a perspective view of an optical system with a place-in-front configuration of a first compensation assembly according to some embodiments.

FIG. 1 shows a perspective view of an optical system 10 with a place-in-front configuration of a first compensation assembly 100 according to some embodiments. The optical system 10 includes the first compensation assembly 100 and a second compensation assembly 200.

The place-in-front configuration of the first compensation assembly 100 refers to a configuration in which the first compensation assembly 100 is place before the second compensation assembly 200 along an optical axis O.

Figure 6:
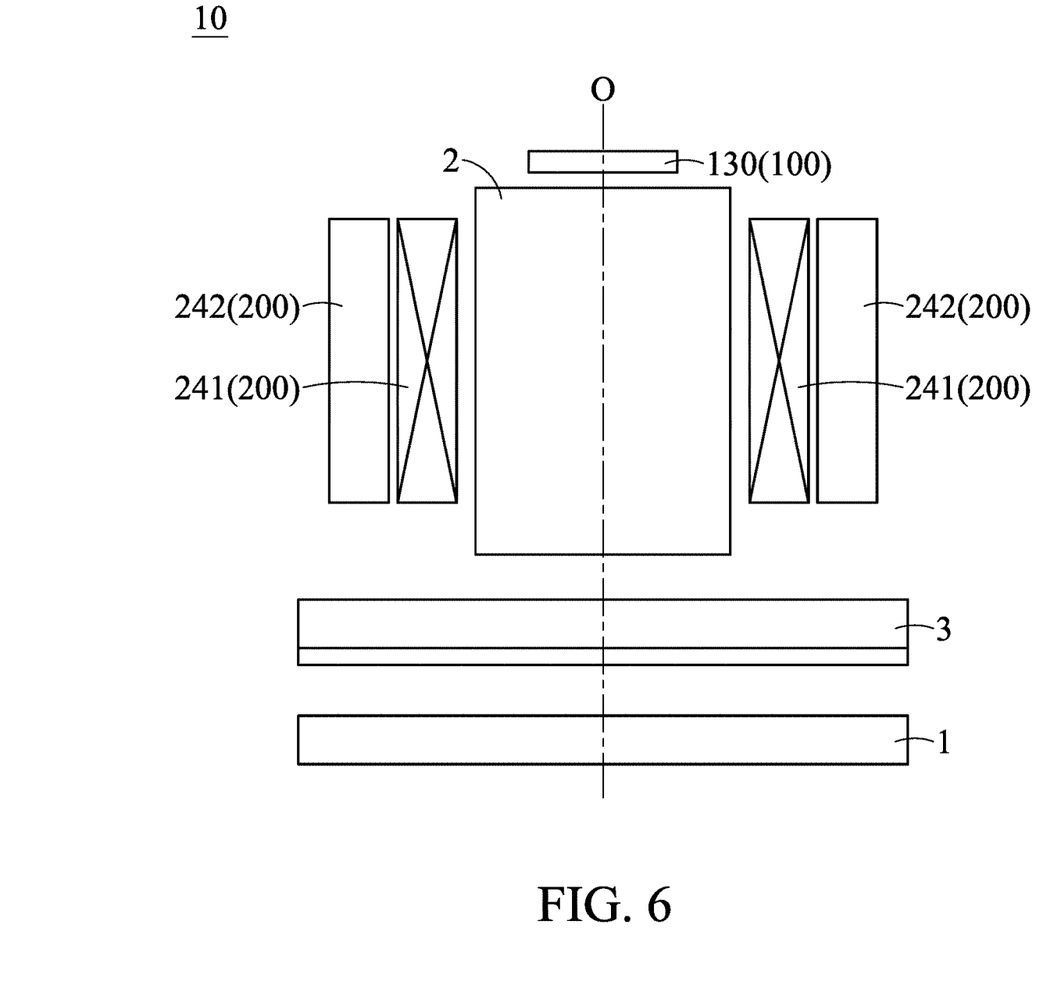
FIG. 6 shows a schematic view of the optical system of one embodiment in the present disclosure with the place-in-front configuration of the first compensation assembly 100.

Therefore, the light first passes through the first compensation assembly 100, and then passes through the second compensation assembly 200 to an optical module (FIG. 6). The structure of the optical system 10 is described in detail later.

Figure 2A:
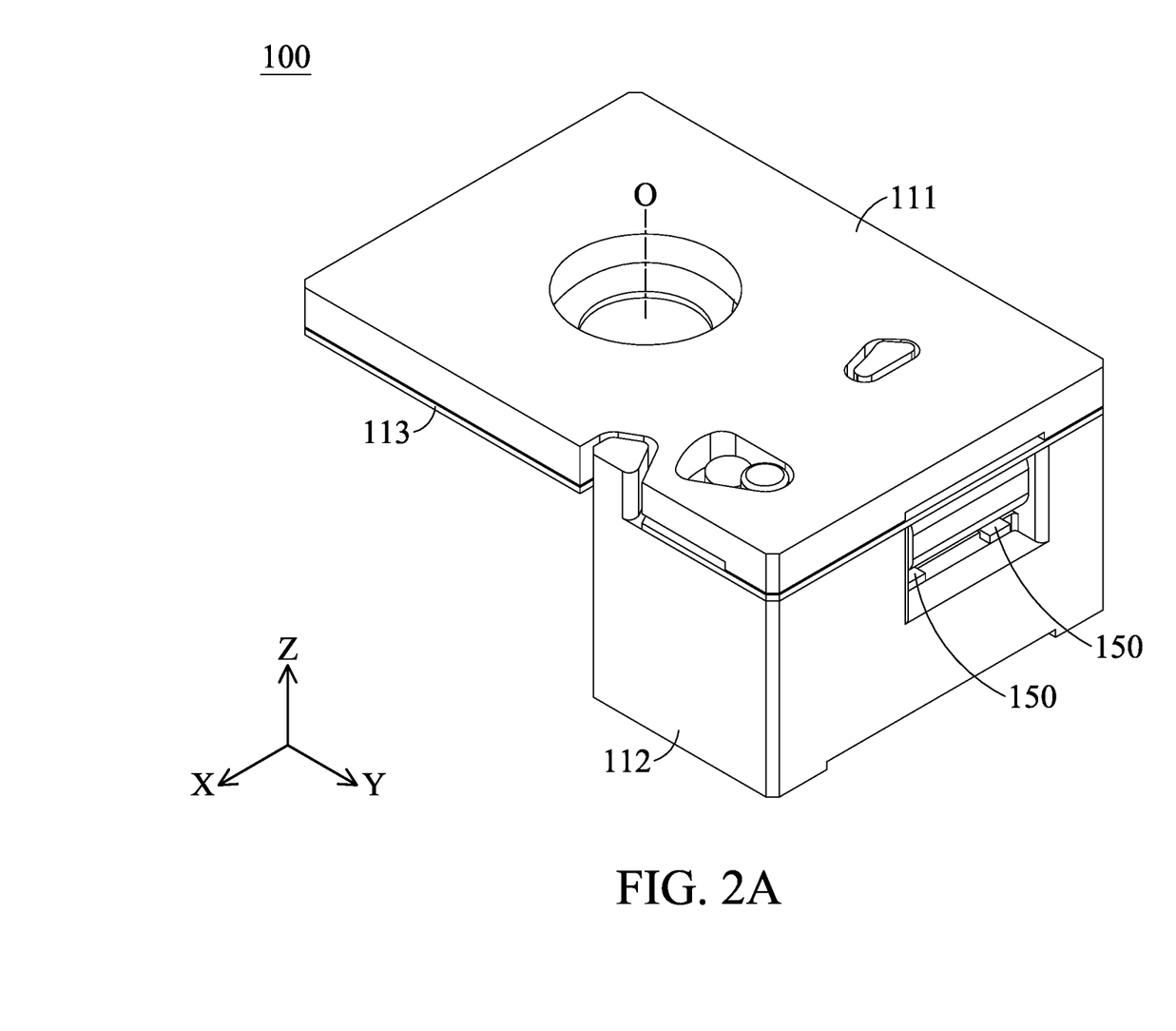
FIG. 2A shows a perspective view of the first compensation assembly according to some embodiments.
Figure 2B:
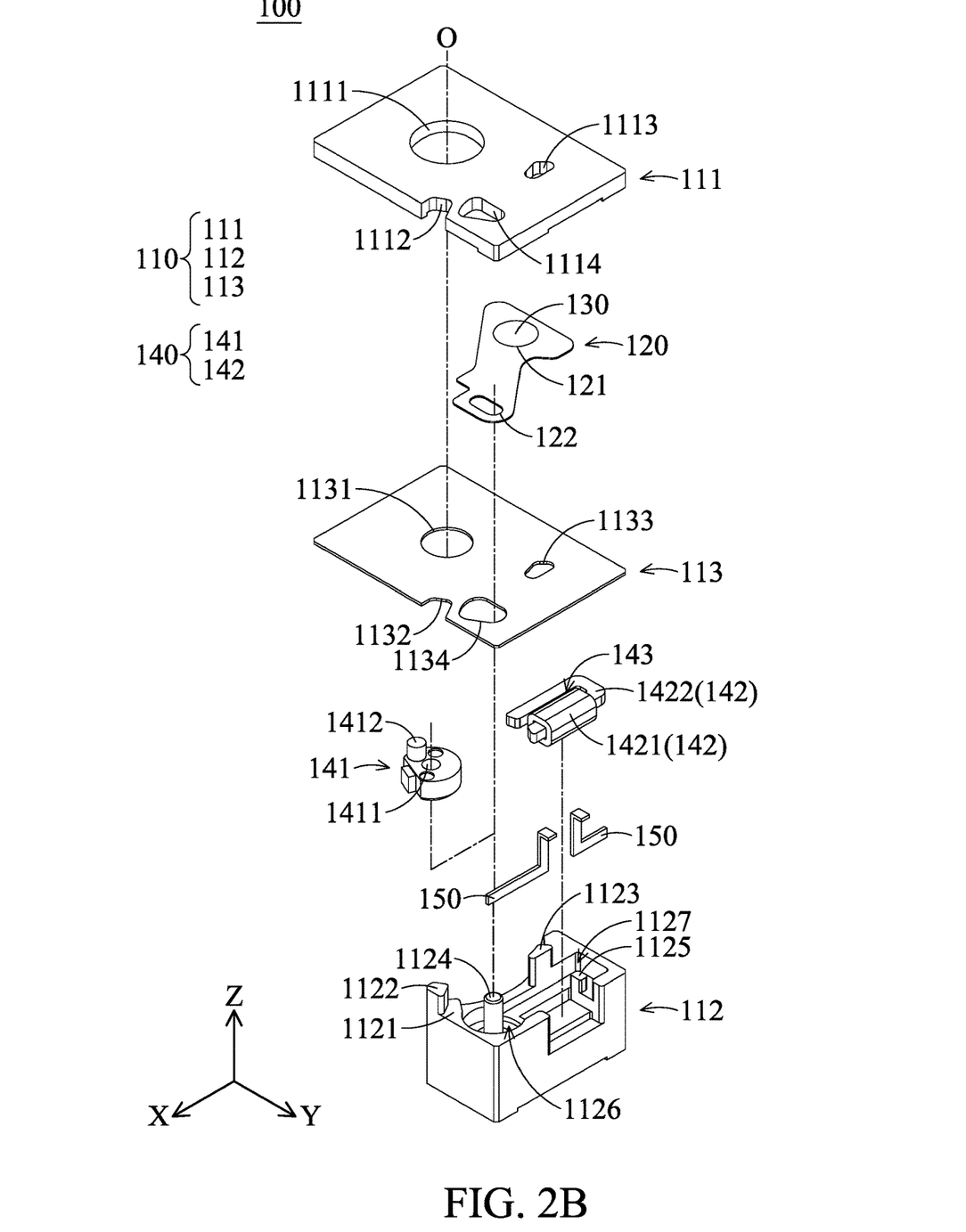
FIG. 2B shows an exploded view of the first compensation assembly according to some embodiments.

FIG. 2A shows a perspective view of the first compensation assembly 100 according to some embodiments. FIG. 2B shows an exploded view of the first compensation assembly 100 according to some embodiments. It is noted that the first compensation assembly 100 shown in FIG. 2A and FIG. 2B is only provided for illustrative propose, and therefore should not be taken as a limitation.

As shown in FIG. 2A and FIG. 2B, the first compensation assembly 100 includes a fixed portion 110, a first movable portion 120, the first optical element 130, a first driving assembly 140, and an electrical connecting portion 150.

In some embodiments of the present disclosure, the fixed portion 110 includes a cover 111, a base 112, and a plate 113.

The cover 111 is connected with the base 112 to accommodate the other elements of the first compensation assembly 100.

The cover 111 includes four openings 1111, 1112, 1113, and 1114 and an edge 1115 (FIG. 4B), the details of which are describe later. The base 112 includes an upper surface 1121, four protrusions 1122, 1123, 1124, 1125, and two accommodating spaces 1126 and 1127.

The upper surface 1121 faces the cover 111. The protrusions 1122 and 1123 extend along the optical axis O from the upper surface 1121. The protrusion 1124 extends from the accommodating space 1126. The protrusion 1125 extends from the accommodating space 1127.

The base 112 and the plate 113 are connected to the second compensation assembly 200 (FIG. 1). The plate 113 is disposed between cover 111 and the upper surface 1121 of the base 112. The plate 113 includes four openings 1131, 1132, 1133, and 1134. The opening 1111 of the cover 111 is aligned with the opening 1131 of the plate 113. The light passes through the opening 1111 of the cover 111 and the opening 1131 of the plate 113.

The protrusion 1122 of the base 112 passes through the opening 1132 of the plate 113 and the opening 1112 of the cover 111, to position the cover 111 and the plate 113. The protrusion 1123 of the base 112 passes through the opening 1133 of the plate 113 and the opening 1113 of the cover 111, to position the cover 111 and the plate 113. The protrusion 1124 of the base 112 passes through the opening 1134 of the plate 113 and the opening 1114 of the cover 111.

In some embodiments of the present disclosure, the first movable portion 120 is disposed between the cover 111 and the plate 113. The first movable portion 120 is movable relative to the fixed portion 110. The first movable portion 120 includes two openings 121 and 122, a first edge 123 (FIG. 4A) and two second edges 124 and 125 (FIG. 4B), the details of which are described below.

Figure 3A:
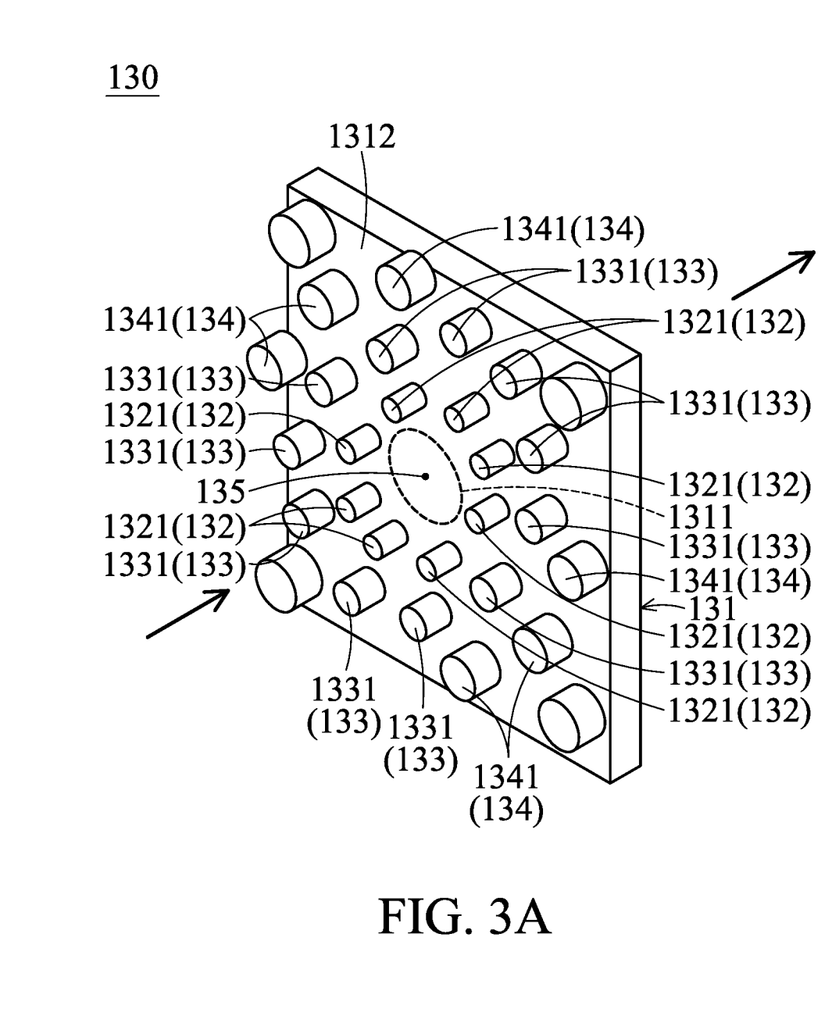
FIG. 3A shows a schematic view of a first optical element.
Figure 3B:
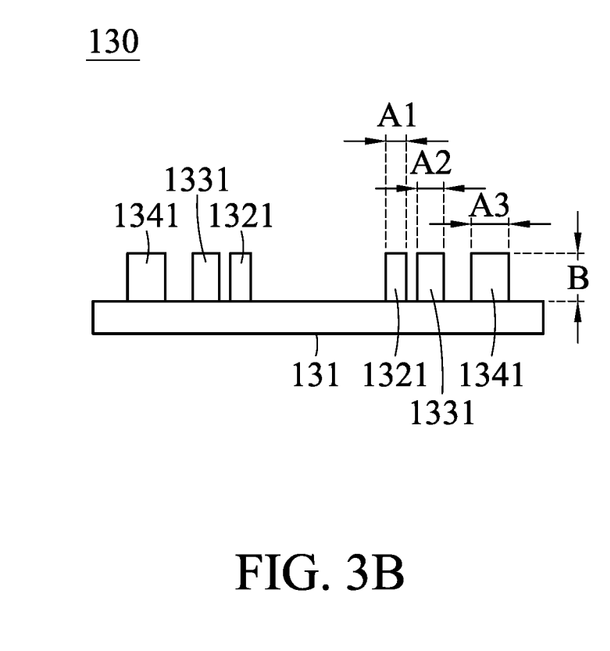
FIG. 3B shows a schematic cross-sectional view of the first optical element.

The opening 121 holds the first optical element 130. In some embodiments of the present disclosure, the first optical element 130 is a Metalens. Please briefly refer to FIG. 3A and FIG. 3B. FIG. 3A shows a schematic view of the first optical element 130. FIG. 3B shows a schematic cross-sectional view of the first optical element 130.

The first optical element 130 includes a substrate 131, a first microstructure 132, a second microstructure 133, a third microstructure 134, and a center 135. The substrate 131 is made of a light-transmitting material. The first microstructure 132, the second microstructure 133, and the third microstructure 134 are disposed on the substrate 131.

It is noted that the first optical element 130 may have more microstructure, such as a fourth microstructure and a fifth microstructure, but for the purpose of illustration, only the first microstructure 132, the second microstructure 133, and the third microstructure 134 are mentioned in FIG. 3A and FIG. 3B.

The center 135 is located in the center of the substrate 131. The first microstructure 132 is closer to the center 135 than the second microstructure 133 when viewed along a direction perpendicular to the substrate 131.

The substrate 131 includes a central region 1311 and a surface 1312. The central region 1311 is a circular area that is free of any microstructures. The area of the central region is at least 10% of the area of the substrate 131. The central region 1311 at least partially overlaps the center 135 of the optical module (FIG. 6) when viewed along a direction perpendicular to the substrate 131. The surface 1312 is a planar structure.

The first microstructure 132 includes a plurality of first microelements 1321 perpendicular to the surface 1312 of the substrate 131. The first microstructure 132 may be regarded as a ring-like structure formed by the first microelements 1321 around the outside of the central region 1311.

Each of the first microelements 1321 has the same structure. Specifically, in some embodiments, each of the first microelements 1321 has the same-sized cylindrical structure as that shown in FIG. 3A and FIG. 3B. However, in other embodiments, each of the first microelements 1321 may have a structure whose shape is not cylindrical. For example, its shape may be a square column, an oval column, a triangular column, or a polygonal column.

Similarly, the second microstructure 133 includes a plurality of second microelements 1331 perpendicular to the surface 1312 of the substrate 131. The second microstructure 133 may be regarded as a ring-like structure formed by the second microelements 1331 around the outside of the first microstructure 132.

Each of the second microelements 1331 has the same structure. Specifically, in some embodiments, each of the second microelements 1331 has the same-sized cylindrical structure as that shown in FIG. 3A and FIG. 3B. However, in other embodiments, each of the second microelements 1331 may have a structure that is not cylindrical. For example, that structure may be a square column, an oval column, a triangular column, or a polygonal column.

Similarly, the third microstructure 134 includes a plurality of third microelements 1341 perpendicular to the surface 1312 of the substrate 131. The third microstructure 134 may be regarded as a ring-like structure formed by the third microelements 1341 around the outside of the second microstructure 133.

Each of the third microelements 1341 has the same structure. Specifically, in some embodiments, each of the third microelements 1341 has a cylindrical structure of the same size as that shown in FIG. 3A and FIG. 3B. However, in other embodiments, each of the third microelements 1341 may have a structure that is not cylindrical. For example, it may be a square column, an oval column, a triangular column, or a polygonal column.

The first microstructure 132 is different from the second microstructure 133 and the third microstructure 134. Specifically, the diameter of the second microstructure 133 is larger than the diameter of the first microstructure 132, and the diameter of the third microstructure 134 is larger than the diameter of the first microstructure 132 and the second microstructure 133.

Please refer to FIG. 3B, it is noted that for the purpose of illustration, the cross-sectional view in FIG. 3B only shows two of the first microelements 1321, two of the second microelements 1331, and two of the third microelements 1341.

As shown in FIG. 3B, the width A1 of the first microelements 1321 is smaller than the width A2 of the second microelements 1331 and the width A3 of the third microelements 1341. The width A2 of the second microelements 1331 is smaller than the width A3 of the third microelements 1341.

As shown in FIG. 3B, the first microelements 1321 and the second microelements 1331 and the third microelements 1341 share the same the height B. The ratio A1/B of the width A1 and height B of the first microelements 1321 is at least greater than ⅓ to ½.

Similarly, the ratio A2/B of the width A2 and height B of the second microelements 1331 is at least greater than ⅓ to ½, and the ratio A3/B of the width A3 and height B of the third microelements 1341 is at least greater than ⅓ to ½. That is to say, the height B of the first microelements 1321 or the second microelements 1331 or the third microelements 1341 is at least two times to three times larger than its width.

Figure 4A:
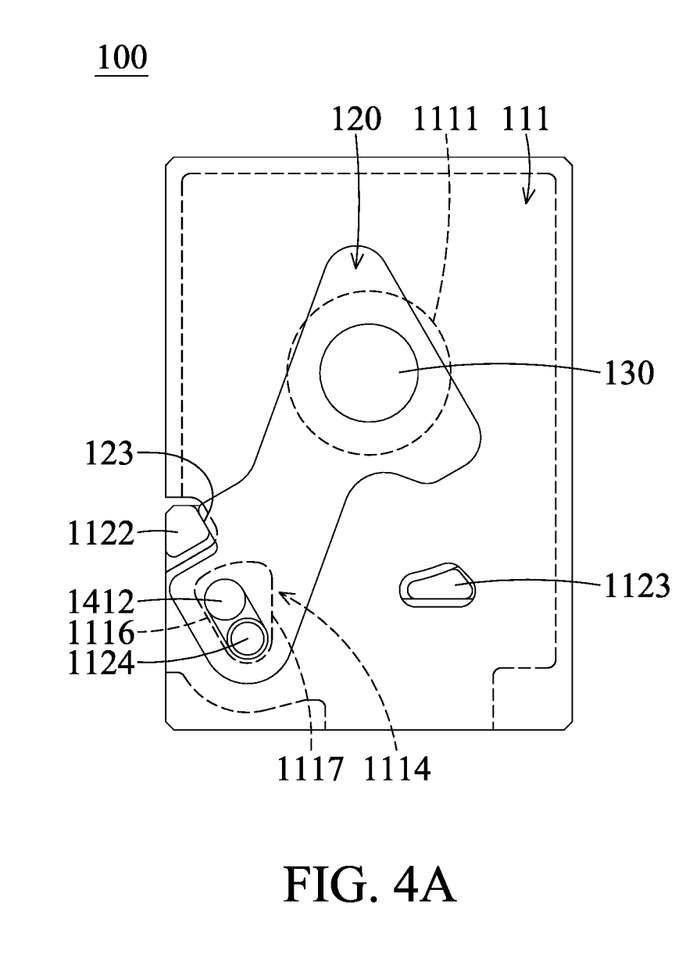
FIG. 4A shows a top view of the first compensation assembly with a first movable portion in a first position, for the propose of illustration, a cover is shown in dash line.
Figure 4B:
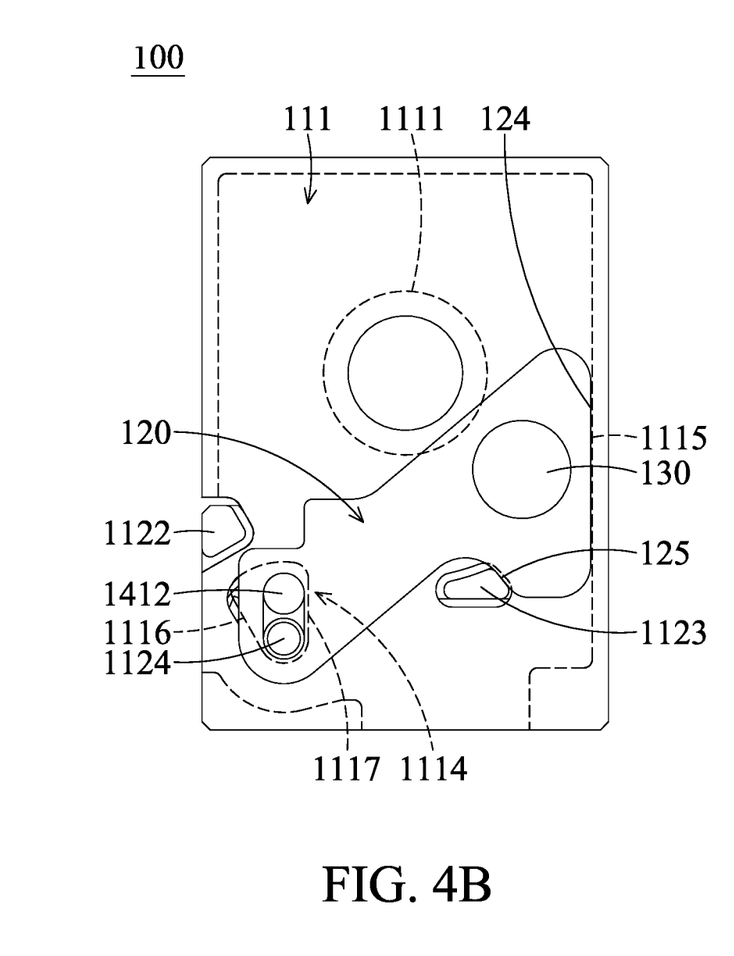
FIG. 4B shows a top view of the first compensation assembly with the first movable portion in a second position, for the propose of illustration, the cover is shown in dash line.

Now refer back to FIG. 2A and FIG. 2B, in some embodiments of the present disclosure, the first driving assembly 140 is configured to drive the first movable portion 120 to move between a first position and a second position relative to the fixed portion 110, the details of which are described with respect to FIG. 4A and FIG. 4B.

In some embodiments of the present disclosure, the first driving assembly 140 includes a magnetic element 141 and a driving portion 142. The magnetic element 141 is disposed in the accommodating space 1126 of the base 112. The magnetic element 141 includes a positioning hole 1411 and a shaft 1412.

The protrusion 1124 of the base 112 passes through the positioning hole 1411 of the magnetic element 141, the opening 1134 of the plate 113, the opening 122 of the first movable portion 120, and the opening 1114 of the cover 111, so that the magnetic element 141 is rotatable about the protrusion 1124 relative to the fixed portion 110. Thereby, the first movable portion 120 may be driven by the magnetic element 141 to move relative to the fixed portion 110.

The shaft 1412 of the magnetic element 141 passes through the opening 1134 of the plate 113, the opening 122 of the first movable portion 120, and the opening 1114 of the cover 111. Thus, when the magnetic element 141 is driven by the driving portion 142, the first movable portion 120 may be driven by the shaft 1412 of the magnetic element 141.

The driving portion 142 is disposed in the accommodating space 1127 of the base 112. The driving portion 142 includes a coil 1421 and a magnetically permeable element 1422. The coil 1421 is wrapped around the magnetically permeable element 1422. The protrusion 1125 of the base 112 positions the driving portion 142 by passes through a gap 143 form in the magnetically permeable element 1422.

The magnetic element 141 and the driving portion 142 correspond to each other. Specifically, when a driving signal is applied to the driving portion 142 (for example, by applying an electric current through an external power source), a magnetic force is generated between the magnetic element 141 and the driving portion 142. Thereby, the magnetic element 141 may be driven to rotate relative to the fixed portion 110.

In some embodiments of the present disclosure, the electrical connecting portions 150 are partially embedded in the base 112. The electrical connecting portions are electrical connected to the driving portion 142 and an external power source (not shown).

FIG. 4A shows a top view of the first compensation assembly 100 with the first movable portion 120 in the first position, for the propose of illustration, the cover 111 is shown in dash line. FIG. 4B shows a top view of the first compensation assembly 100 with the first movable portion 120 in the second position, for the propose of illustration, the cover 111 is shown in dash line.

As shown in FIG. 4A, the opening 1114 of cover 111 includes two edges 1116 and 1117. When the shaft 1412 is driven to move toward the edge 1116, the edge 123 of the first movable portion 120 comes into contact with the protrusion 1122 of the base 112, and the first optical element 130 aligns with the opening 1111 of the cover 111. As such, the light enters the optical module (FIG. 6) through the first optical element 130 when the first movable portion 120 is in the first position.

As shown in FIG. 4B, when the shaft 1412 is driven to move toward the edge 1117, the edge 124 of the first movable portion 120 comes into contact with the edge 1115 of the cover 111, the edge 125 of the first movable portion 120 comes into contact with the protrusion 1123 of the base 112, and the first optical element 130 does not align with the opening 1111 of the cover 111. As such, the light enters the optical module without passing through the first optical element 130 when first movable portion 120 is in the second position.

Figure 5:
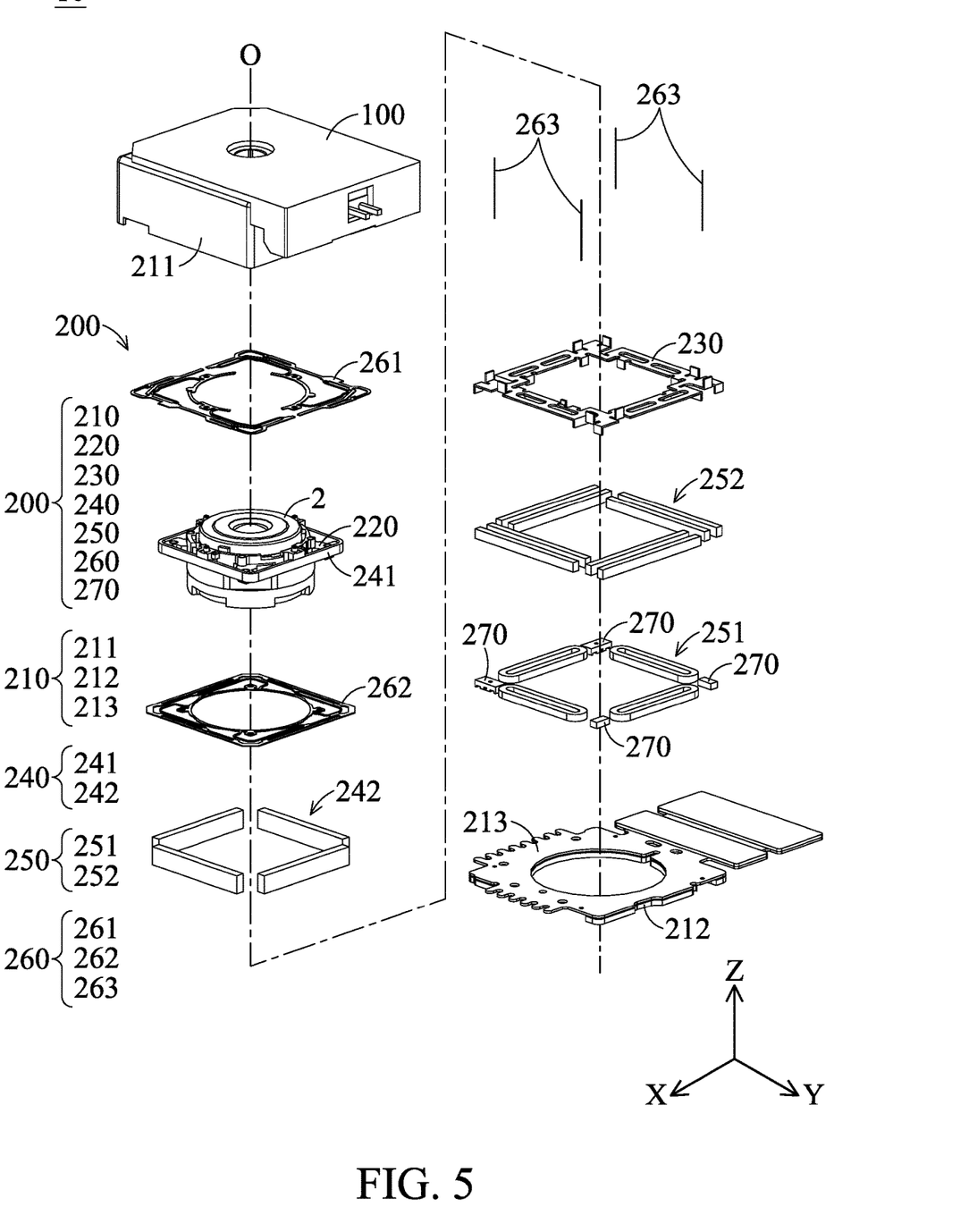
FIG. 5 shows an exploded view of the optical system with the place-in-front configuration of the first compensation assembly according to some embodiments.

FIG. 5 shows an exploded view of the optical system 10 with the place-in-front configuration of the first compensation assembly 100 according to some embodiments. Since the details of the first compensation assembly 100 are described in detail in relation to FIG. 2A to FIG. 2B, the detailed description of the structure of the first compensation assembly 100 is omitted here. The detailed description of the structure of the second compensation assembly 200 is described below.

According to some embodiments of the present disclosure, the second compensation assembly 200 includes a fixed portion 210, a second movable portion 220, a frame 230, a focusing driving assembly 240, a second driving assembly 250, a supporting assembly 260, and a set of sensing elements 270.

According to some embodiments of the present disclosure, the fixed portion 210 includes a housing 211, a base 212, and a circuit member 213. The housing 211 is connected with the base 212 to form an accommodating space for other elements in the second compensation assembly 200. The base 212 may also be a holder that is connected to the optical module (FIG. 6). The base 212 is parallel to the circuit member 213. The circuit member 213 is fixedly disposed on the base 212.

According to some embodiments of the present disclosure, the second movable portion 220 is connected to a second optical element 2. The second movable portion 220 is a holder that is movable in the optical axis O relative to the fixed portion 210 to adjust the posture or position of the second optical element 2, thereby achieving the purpose of optical auto-focusing (AF).

The frame 230 is a movable portion that may drive the second movable portion 220 to move relative to the fixed portion 210 in the XY-plane, so as to adjust the posture or position of the second optical element 2, thereby achieving the effect of optical image stabilization (OIS).

According to some embodiments of the present disclosure, the focusing driving assembly 240 includes a coil 241 and a set of magnetic elements 242. The coil 241 is disposed on the second movable portion 220. The magnetic elements 242 are disposed on the upper portion of the frame 230.

The coil 241 and the magnetic elements 242 correspond to each other. Specifically, when a driving signal is applied to the coil 241 (for example, by applying an electric current through an external power source), a magnetic force is generated between the coil 241 and the magnetic elements 242. Thereby, the second movable portion 220 may be driven to move along the optical axis O relative to the fixed portion 210 to achieve the effect of auto-focusing.

According to some embodiments of the present disclosure, the second driving assembly 250 is configured to drive the second movable portion 220 to move relative to the fixed portion 210 within a range of motion. It is noted that the light enters the optical module (FIG. 6) through the second optical element 2 when the second movable portion 220 is located at any position in the range of motion.

The second driving assembly 250 includes a set of coils 251 and a set of magnetic elements 252. The coils 251 are disposed on the circuit member 213. The magnetic elements 252 are disposed on the lower portion of the frame 230.

The coils 251 and the magnetic elements 252 correspond to each other. Specifically, when a driving signal is applied to the coils 251 (for example, by applying an electric current through an external power source), a magnetic force is generated between the coils 251 and the magnetic elements 252. Thereby, the frame 230 may be driven to move the second movable portion 220 along the XY-plane to achieve the effect of optical image stabilization.

According to some embodiments of the present disclosure, the supporting assembly 260 includes an upper elastic element 261, a lower elastic element 262, and a set of suspension wires 263. The second movable portion 220 is movably connected to the housing 211 via the upper elastic element 261. The second movable portion 220 is movably connected to the frame 230 via the lower elastic element 262.

Before a driving signal is applied to the focusing driving assembly 240 and the second driving assembly 250, the upper elastic element 261 and the lower elastic element 262 keep the second movable portion 220 at an initial position relative to the fixed portion 210.

The four suspension wires 263 are located at the four corners of the second compensation assembly 200. One end of each suspension wires 263 is connected to the upper elastic element 261. The other end of each suspension wires 263 is connected to the base 212.

According to some embodiments of the present disclosure, the sensing elements 270 are disposed on the circuit member 213. In some embodiments, the sensing elements 270 may serve as a control element. Specifically, the sensing elements 270 are all-in-one integrated circuits that each encapsulate a sensing integrated circuit and a control integrated circuit in the same package. The sensing elements 270 sense the position of the frame 230 relative to the fixed portion 210, and then control the frame 230 to move to a desired position to achieve closed-loop control.

In some embodiments, the sensing elements may include, for example, a Hall effect sensor, a magnetoresistance effect sensor, a giant magnetoresistance effect sensor, a tunneling magnetoresistance effect sensor, or a fluxgate sensor or other sensing elements, depending on design requirements.

It should be appreciated that the present invention does not limit the number of magnetic elements and reference elements used for sensing. In different embodiments, different numbers of magnetic elements and reference elements for sensing may be included, depending on design requirements.

In some embodiments, the sensing elements 270 include inertial sensing elements outputting a sensing signal. In this instance, the optical system 10 determines the mode from a non-compensation mode, a first compensation mode, and a second compensation mode according to the sensing signal, the details of which is described relative to FIG. 9.

FIG. 6 shows a schematic view of the optical system 10 of one embodiment in the present disclosure with the place-in-front configuration of the first compensation assembly 100. Compared with the optical system 10 shown in FIG. 1, FIG. 6 further shows an optical module 1 and an infrared filter (IR filter) 3.

As shown in FIG. 6, the first compensation assembly 100 and the second compensation assembly 200 are disposed sequentially in the direction of the light, so that the light first passes through the first compensation assembly 100 and then passes through the second compensation assembly 200, then enters the optical module 1. In the embodiment shown in the FIG. 6, the area of the first optical element 130 is smaller than the second optical element 2.

Figure 7:
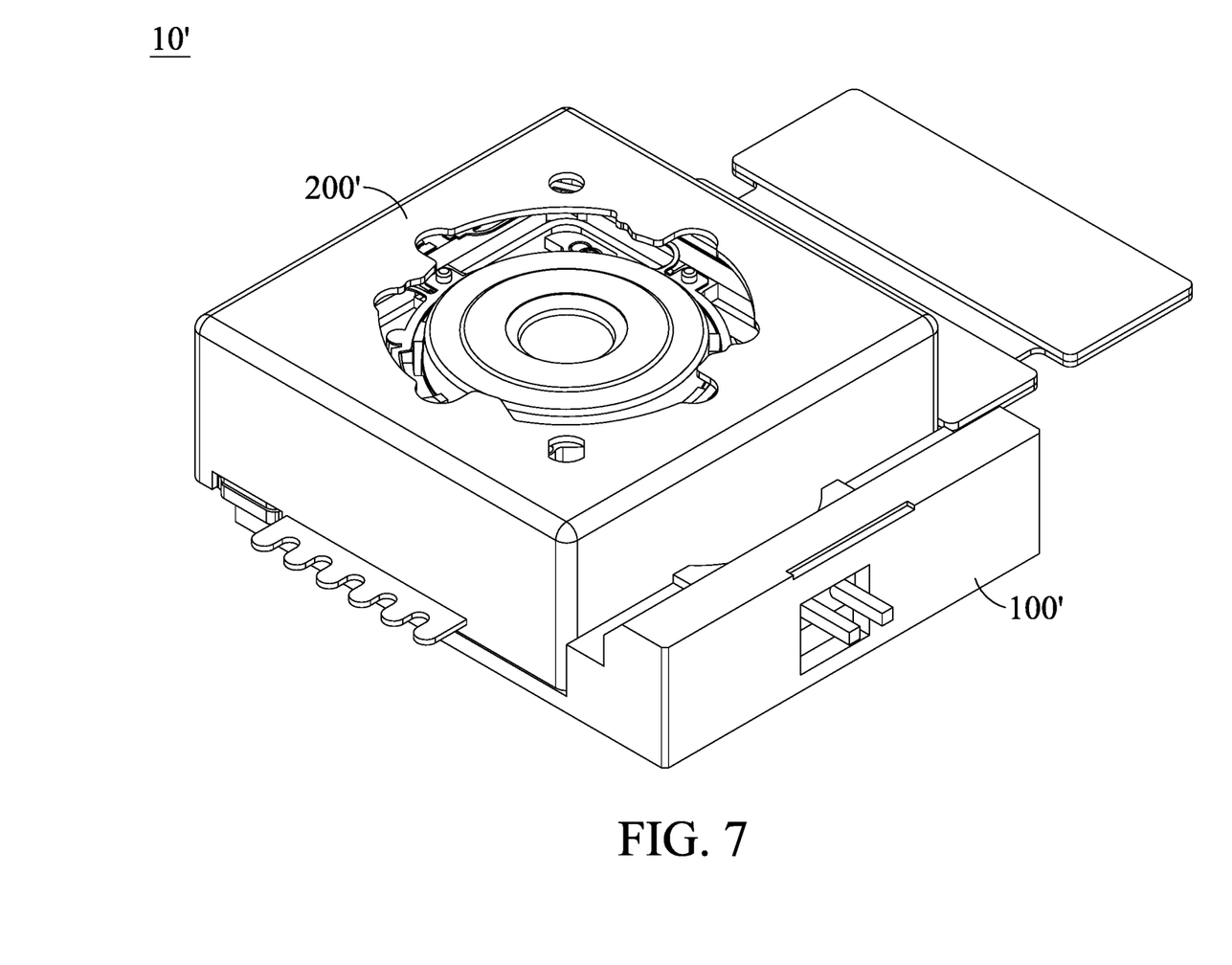
FIG. 7 shows a perspective view of the optical system with a place-in-back configuration of the first compensation assembly according to some embodiments.
Figure 8:
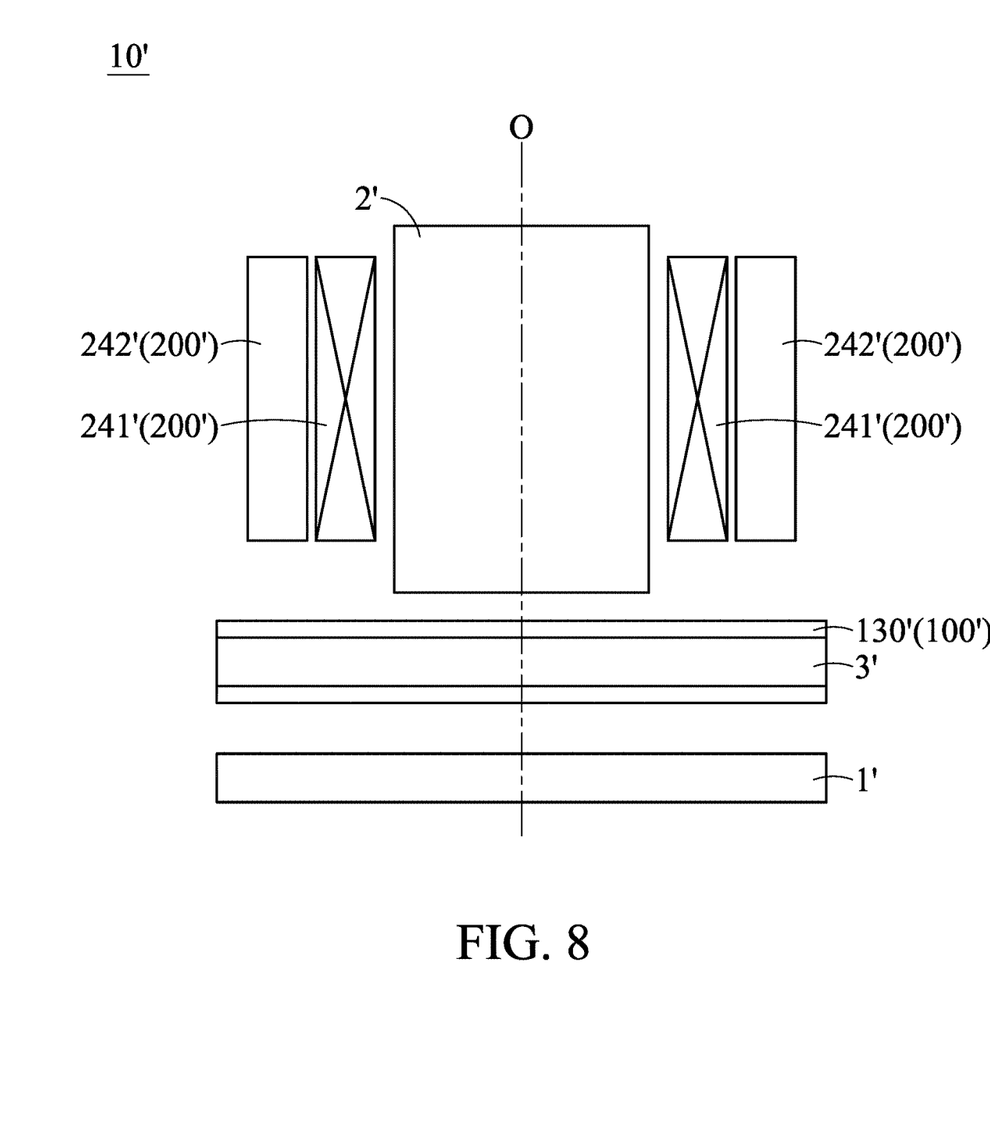
FIG. 8 shows a schematic view of the optical system of one embodiment in the present disclosure with the place-in-back configuration of the first compensation assembly.

FIG. 7 shows a perspective view of an optical system 10' with a place-in-back configuration of the first compensation assembly 100' according to some embodiments. FIG. 8 shows a schematic view of the optical system 10' of one embodiment in the present disclosure with the place-in-back configuration of the first compensation assembly 100'.

As shown in FIG. 7 and FIG. 8, the second compensation assembly 200' and the first compensation assembly 100' are disposed sequentially in the direction of the light, so that the light first passes through the second compensation assembly 200' and then passes through the first compensation assembly 100', then enters the optical module 1'. The area of the first optical element 130' is larger than the second optical element 2'.

It should be noted that the present disclosure includes embodiments with various configurations, such as, when the second optical element 2 serves as a lens, the second driving assembly 250 may be designed to drive the second optical element 2 to move relative to the fixed portion 110 and 210.

Alternatively, in other embodiments where the second optical element 2 serves as a photosensitive element in the optical module 1, the second driving assembly 250 may be designed to drive the second optical element 2 to move relative to the fixed portion 110 and 210.

Figure 9:
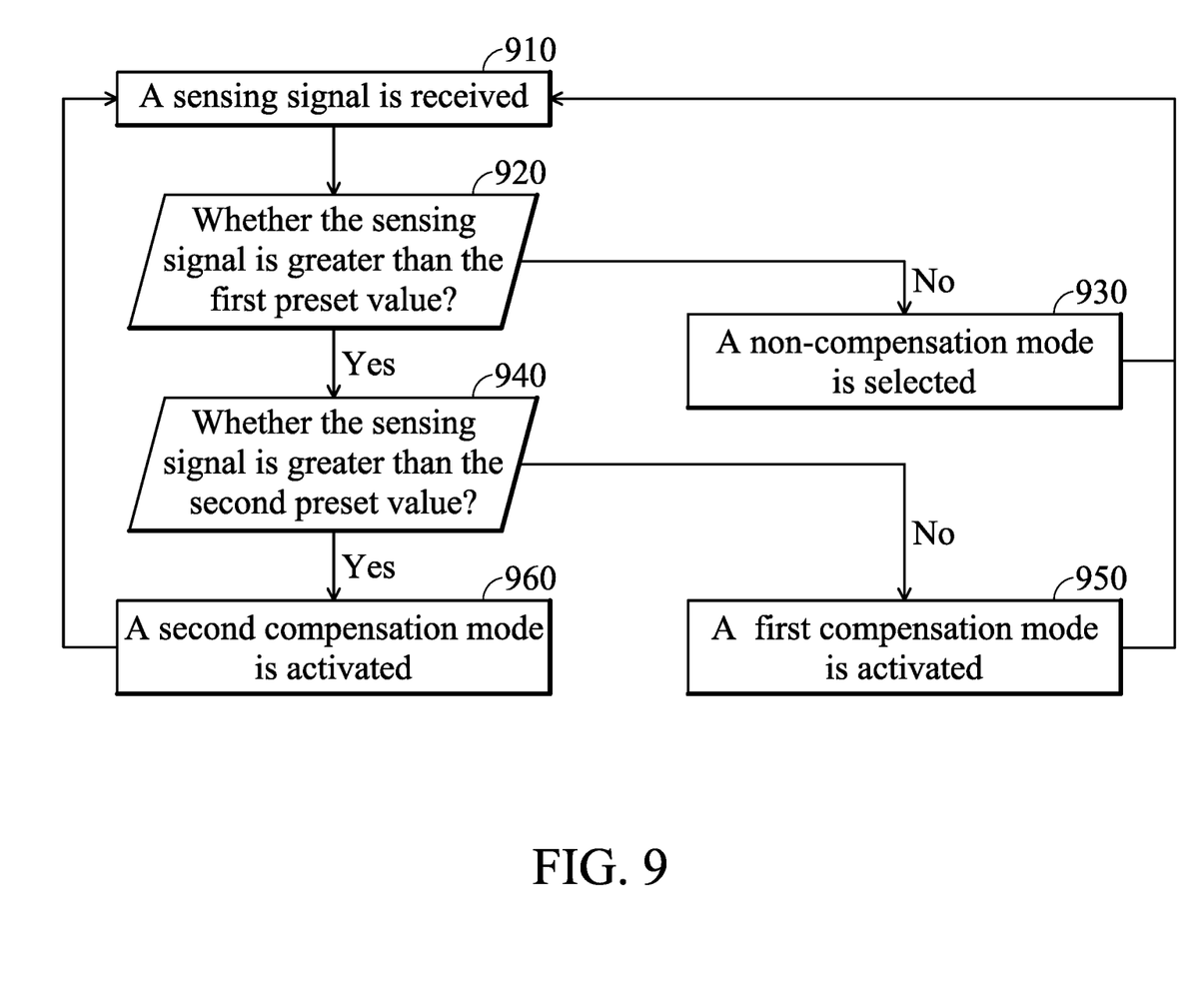
FIG. 9 is a flow chart of determining a mode for compensating the light entering the optical system.

FIG. 9 is a flow chart of determining the mode for compensating the light entering the optical system 10. The optical system 10 includes a non-compensation mode, a first compensation mode, and a second compensation mode for compensating the light.

The mode for compensating the light entering the optical system 10 is selected from the non-compensation mode, the first compensation mode, and the second compensation mode according to environmental conditions.

According to some embodiments of the present disclosure, block 910 includes that a sensing signal is received from the sensing elements 270. Block 920 includes that the control element (which is the sensing element 270 that include a control integrated circuit in the present invention) determines whether the sensing signal is greater than a first preset value. Block 930 includes that the control element determines the sensing signal is smaller than the first preset value, and the non-compensation mode is selected. The first driving assembly 140 and the second driving assembly 250 are not driven during the non-compensation mode.

According to some embodiments of the present disclosure, block 940 includes that the control element have determined the sensing signal is greater than the first preset value, and proceed to determine whether the sensing signal is greater than a second preset value. Block 950 includes that the control element determines the sensing signal is smaller than the second preset value, and the first compensation mode is activated. The second driving assembly 250 drives the second movable portion 220 to move during the first compensation mode.

According to some embodiments of the present disclosure, block 960 includes that the control element determines the sensing signal is greater than the second preset value, and the second compensation mode is activated. The first driving assembly 140 drives the first movable portion 120 to move and second driving assembly 250 drives the second movable portion 220 to move during the second compensation mode.

In addition, in the embodiments where the sensing elements 270 are inertial sensing element, the second compensation mode is activated when a rotation signal in the sensing signal is greater than a rotation preset value.

In summary, the optical system of the present disclosure has a first compensation assembly and a second compensation assembly. When the degree of shaking caused by external force is larger, the first compensating assembly and the second compensating assembly may both be used to compensate the image, so as to improve the relatively poor peripheral imaging effect of the image caused by only using optical image stabilization (OIS) to compensate the image in the prior art.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical system, comprising:
a holder connecting an optical module; and
a first compensation assembly compensating a light;
wherein the light enters the optical module through the first compensation assembly;
wherein the first compensation assembly comprises a first optical element, comprising:
a substrate with light-transmitting material;
a first microstructure disposed on the substrate; and
a second microstructure disposed on the substrate;
wherein the first microstructure is different from the second microstructure.

2. The optical system as claimed in claim 1, wherein the first optical element has a center, and the first microstructure is closer to the center of the first optical element than the second microstructure when viewed along a direction perpendicular to the substrate.

3. The optical system as claimed in claim 1, wherein the substrate comprises a central region, and the central region is free of any microstructures.

4. The optical system as claimed in claim 3, wherein the area of the central region is at least 10% of the area of the substrate.

5. The optical system as claimed in claim 3, wherein the central region at least partially overlaps the center of the optical module when viewed along a direction perpendicular to the substrate.

6. The optical system as claimed in claim 1, wherein the substrate comprises a surface with a planar structure, the first microstructure comprises a plurality of first microelements, the second microstructure comprises a plurality of second microelements, each of the first microelements has the same structure, each of the second microelements has the same structure, and the first microelements and the second microelements have different sizes.

7. The optical system as claimed in claim 6, wherein each of the first microelements has a cylindrical structure.

8. The optical system as claimed in claim 6, wherein the height of the first microelements and the second microelements are the same, and the height of the first microelements and the second microelements is at least two times to three times larger than its width.

9. An optical system, comprising:
a holder connecting an optical module; and
a first compensation assembly compensating a light;
wherein the light enters the optical module through the first compensation assembly;
wherein the first compensation assembly further comprises:
a fixed portion;
a first movable portion connecting a first optical element; and
a first driving assembly configured to drive the first movable portion to move between a first position and a second position relative to the fixed portion;
wherein the light enters the optical module through the first optical element when the first movable portion is in the first position, and the light enters the optical module without passing through the first optical element when the first movable portion is in the second position.

10. The optical system as claimed in claim 9, further comprising a second compensation assembly compensating the light, wherein the light enters the optical module through the second compensation assembly, and the second compensation assembly comprises:
a second movable portion connecting a second optical element; and
a second driving assembly configured to drive the second movable portion to move relative to the fixed portion within a range of motion;
wherein the light enters the optical module through the second optical element when the second movable portion is located at any position in the range of motion.

11. The optical system as claimed in claim 10, wherein the second optical element is a lens, and the second driving assembly is configured to drive the second optical element to move relative to the fixed portion.

12. The optical system as claimed in claim 10, wherein the second optical element is a photosensitive element in the optical module, and the second driving assembly is configured to drive the second optical element to move relative to the fixed portion.

13. The optical system as claimed in claim 10, wherein the first compensation assembly and the second compensation assembly are disposed sequentially in the direction of the light, so that the light first passes through the first compensation assembly and then passes through the second compensation assembly, then enters the optical module, and the area of the first optical element is smaller than the second optical element.

14. The optical system as claimed in claim 10, wherein the second compensation assembly and the first compensation assembly are disposed sequentially in the direction of the light, so that the light first passes through the second compensation assembly and then passes through the first compensation assembly, then enters the optical module, and the area of the first optical element is larger than the second optical element.

15. The optical system as claimed in claim 10, further comprising a control element, determining a mode from a non-compensation mode, a first compensation mode and a second compensation mode, to compensate the light, wherein the first driving assembly and the second driving assembly are not driven during the non-compensation mode, the second driving assembly is driven to move the second movable portion during the first compensation mode, and the first driving assembly is driven to move the first movable portion and the second driving assembly is driven to move the second movable portion during the second compensation mode, one of the non-compensation mode, the first compensation mode, and the second compensation mode is determined by the control element according to environmental conditions.

16. The optical system as claimed in claim 15, further comprising a sensing element, wherein the first compensation mode is activated when a sensing signal that is greater than a first preset value is received, wherein the sensing signal is output by the sensing element.

17. The optical system as claimed in claim 15, wherein the second compensation mode is activated when a sensing signal that is greater than a second preset value is received, wherein the sensing signal is output by the sensing element.

18. The optical system as claimed in claim 15, further comprising an inertial sensing element, outputting a sensing signal, wherein the control element determines the mode from the non-compensation mode, the first compensation mode, and the second compensation mode according to the sensing signal.

19. The optical system as claimed in claim 18, wherein the second compensation mode is activated when a rotation signal in the sensing signal is greater than a rotation preset value.

* * * * *